United States Patent [19]

Taylor

[11] Patent Number: 5,158,251
[45] Date of Patent: Oct. 27, 1992

[54] AERODYNAMIC SURFACE TIP VORTEX ATTENUATION SYSTEM

[75] Inventor: Robert M. Taylor, Vienna, Va.

[73] Assignee: The United State of America as represented by the Secretary of the Navy, Washington, D.C.

[21] Appl. No.: 614,411

[22] Filed: Nov. 16, 1990

[51] Int. Cl.$^5$ ............................................ B64C 21/08
[52] U.S. Cl. .................................... 244/199; 244/207
[58] Field of Search ................................ 244/199, 207

[56] References Cited

U.S. PATENT DOCUMENTS

| | | | |
|---|---|---|---|
| 2,163,655 | 6/1939 | Zimmerman | 244/40 |
| 2,650,781 | 9/1953 | Taylor | 244/40 |
| 2,925,129 | 2/1960 | Yuan et al. | 170/135.4 |
| 3,446,288 | 5/1969 | Yuan | 170/135.4 |
| 3,480,234 | 11/1969 | Cornish, III | 244/40 |
| 3,692,259 | 9/1972 | Yuan | 244/40 |
| 3,841,587 | 10/1974 | Freed | 244/40 A |
| 3,881,669 | 5/1975 | Lessen | 244/40 R |
| 3,889,903 | 6/1975 | Hilby | 244/42 CC |
| 3,936,013 | 2/1976 | Yuan | 244/40 A |
| 3,984,070 | 10/1976 | Patterson, Jr. | 244/130 |
| 4,017,041 | 4/1977 | Nelson | 244/40 R |
| 4,019,696 | 4/1977 | Hirt et al. | 244/42 CD |
| 4,040,578 | 8/1977 | Yuan | 244/17.19 |
| 4,099,691 | 7/1978 | Swanson et al. | 244/207 |
| 4,108,403 | 8/1978 | Finch | 244/199 |
| 4,146,197 | 3/1979 | Grotz | 244/12.5 |
| 4,190,219 | 2/1980 | Hackett | 244/199 |
| 4,382,569 | 5/1983 | Boppe et al. | 244/199 |
| 4,387,869 | 5/1983 | Englar et al. | 244/207 |
| 4,398,687 | 8/1983 | Nicholas, Jr. et al. | 244/207 |
| 4,463,920 | 8/1984 | Nichols, Jr. et al. | 244/207 |
| 4,477,042 | 10/1984 | Griswold, II | 244/199 |
| 4,478,380 | 10/1984 | Frakes | 244/199 |
| 4,674,716 | 6/1987 | Moore | 244/207 |
| 4,682,746 | 7/1987 | Thomas | 244/207 |
| 4,705,240 | 11/1987 | Dixon | 244/199 |
| 4,736,913 | 4/1988 | Bennett et al. | 244/130 |
| 4,770,607 | 9/1988 | Cycon et al. | 416/90 A |

FOREIGN PATENT DOCUMENTS

| | | | |
|---|---|---|---|
| 1756541 | 4/1970 | Fed. Rep. of Germany | 244/199 |
| 2159184 | 6/1973 | Fed. Rep. of Germany | 244/199 |
| 837705 | 6/1960 | United Kingdom | 244/199 |

OTHER PUBLICATIONS

Wille, R., and Fernholz, H., "Report on the First European Mechanics Colloqium on the Coanda Effect," Journal of Fluid Mechanics, vol. 23, part 4, pp. 801–819, Cambridge at the University Press (1965).

Williams, R. M., Leitner, R. T., and Rogers, E. O. "X-Wing: A New Concept in Rotary Wing VTOL," David W. Taylor Ship Research and Development Center, Bethesda, Md. Presented to the American Helicopter Society Symposium on Rotor Technology, Aug. 1976.

Primary Examiner—Galen Barefoot
Attorney, Agent, or Firm—Howard Kaiser

[57] ABSTRACT

Apparatus and method for attenuating fluid foil tip vortices, featuring a "Coanda tip" and a "Coanda curtain." The fluid foil tip has a Coanda surface and means for discharging compressed fluid adjacent thereto; a resultant fluid barrier is formed generally chordwise and perpendicular to the fluid foil plane and tangential to the fluid foil tip upon Coanda entrainment and deflection of the discharged compressed fluid. The fluid barrier prevents crossflow from the higher pressure fluid region to the lower pressure fluid region, the fluid regions being separated by the fluid foil when moving relatively through a fluid, the fluid barrier thereby stemming tip vortex generation at its source.

1 Claim, 4 Drawing Sheets

AERODYNAMIC SURFACE TIP VORTEX ATTENUATION SYSTEM

The invention described herein may be manufactured and used by or for the Government of the United States of America for governmental purposes without the payment of any royalties thereon or therefor.

BACKGROUND OF THE INVENTION

The present invention relates to airfoils and other aerodynamic and hydrodynamic surface structures which generate tip vortices due to motion relative to a fluid such as air or water, more particularly aircraft wings which generate wing tip vortices.

Tip vortex generation is a well-known phenomenon involving surface-fluid interaction which is manifest in various aerodynamic and hydrodynamic contexts. It is of particular concern to aircraft designers, who for many years have been considering various approaches to alleviating the attendant undesirable effects of wing tip vortex generation.

It is generally understood that the air flowing over the aircraft wing achieves a higher velocity and a correspondingly lower pressure than the air flowing under the wing, resulting in an upward force called lift; however, due to this pressure differential, the air near each wing tip tends to flow from beneath the wing to above the wing, this "leakage" around the tips thus forming wing tip vortices. One suggested explanation is that the air flowing over the wing tends to flow slightly inwards from the wing tips; the air flowing under the wing tends to flow slightly outwards toward the wing tips. When these airflows meet at the trailing edge numerous little vortices are formed, which unite to form two large vortices, one at each wing tip.

Whatever the precise explanation, these wing tip vortices represent a real phenomenon with real, potentially negative effects. An induced downward velocity behind the wing lowers the effective angle of attack, which in turn causes reduced lift and induced drag, a component of the overall drag. The reduced lift can also be viewed as attributable to decrease in average pressure below the wing. Lower effective angle of attack, reduced lift and induced drag are especially critical factors during takeoff, ascent, cruise, descent, and landing. Moreover, wing tip vortices which are trailing the moving wing and remain for a period of time constitute a hazardous condition for aircraft which follow in its wake. This wake turbulence is of especially alarming magnitude for very large aircraft. Air traffic control personnel at airports must be ever cognizant of wake turbulence in timing and spacing incoming and outgoing flights.

Wing tip vortex generation and concomitant deleterious effects can be mitigated and wing efficiency improved by increasing the aspect ratio of the wing, which is the square of the wing span divided by the wing area. One way to accomplish this is to simply increase the aspect ratio by dimensionally increasing the wing span and/or decreasing the wing chord. Another way, and one which has been the subject of many patents, is to attempt to effectively increase the wing span and thus effectively increase the aspect ratio by reducing or mitigating the wing tip vortex generation itself.

Various approaches have been taken in attempting to attenuate the wing tip vortices. Generally speaking, they may be viewed as falling into two categories. The first utilizes external structural shape or configuration for directing or redirecting natural airflow so as to somehow counteract vortex generation. The second, which may have configurational aspects, directs airflow or gas flow from a source originating from within the aircraft for this purpose. The source of the fluid discharge can be, for example, a plenum, blower, compressor or engine.

An example of the former category is provided by Hackett, U.S. Pat. No. 4,190,219, which discloses a boom attached to a vertical vane located adjacent to and aft the wing tip. This device acts as a vortex diffuser for attenuating the vortex once it has formed and is trailing the wing tip. Frakes, U.S. Pat. No. 4,478,380, an example which takes a different approach, discloses a scoop located near the wing tip. The inlet of the scoop is on the lower surface of the wing near the leading edge; the outlet is on the upper surface near the trailing edge. High pressure air from the lower surface is fed to the upper surface outlet with the result of reducing the pressure differential at the wing tip trailing edge which in turn results in reduction of the wing tip vortex. Finch, U.S. Pat. No. 4,108,403, discloses a wing tip construction which extends outward and aft and curves downward Nelson, U.S. Pat. No. 4,017,041, discloses retractable foils which extend upwardly or downwardly from a location at or near the wing tip.

Configurational approaches to tip vortex reduction have met with varying degrees of qualified success. One reason is that structural deviation or amplification which is designed to reduce the tip vortex also inherently changes the aerodynamics of the aircraft, with the result that the concomitant aerodynamic penalties, e.g., reduced lift or increased drag, will at least somewhat offset the aerodynamic benefits of the tip vortex reduction. The resultant change in fluid flow pattern will similarly alter the aerodynamic balance. Some approaches are multipurpose and the vortex-related purpose is secondary or ancillary. Moreover, these approaches seek to limit the tip vortex once it has been more or less generated. The effectiveness of tip vortex attenuation tends to increase as it attacks the tip vortex at an increasingly early stage in its formation.

Conventional fluid discharge approaches share these deficiencies. They inject fluid into the aerodynamic scheme, and incorporation therein of configurational aspects will even further disturb the aerodynamic balance. In some cases nonexclusivity of the vortex attenuation purpose is a compromising factor. Temporal lateness of the fluid-vortex interaction in the vortex formation process also militates against accomplishing objectives of vortex attenuation.

Freed, U.S. Pat. No. 3,841,587, and Lessen, U.S. Pat. No. 3,881,669, disclose discharging fluid rearwardly and generally perpendicular to the wingspan from the trailing edge at or near the wing tip. Lessen incorporates a counterrotational aspect into the fluid stream vis-a-vis the vortex. Both Freed and Lessen seek to act on the already-established trailing vortex. Wake turbulance is alleviated but the afore-discussed aerodynamic goals of improving lift and reducing drag are largely ignored.

A capture device at the wing tip which is concave downward and inward is disclosed by Boppe et al, U.S. Pat. No. 4,382,569. The device seeks to capture lower-to-upper wing tip leakage and utilize negatively pressured fluid discharge to aspirate this crossflow and release it somewhere else. Although Boppe does seek to attack the source of the vortex generation, the device configuration and aspirated fluid release serve to negative the positive aerodynamic effects.

Cornish III, U.S. Pat. No. 3,480,234, discloses releasing spanwise fluid flow from a point some distance from the wing tip and directing it over the upper wing surface. This discharged spanwise fluid flow along the upper wing causes its own locked vortex to form from the combination thereof with entrained air which is carried along with it. The vortex is coaxial with the spanwise flow and is rotating in a direction which brings the main chordwise airflow over the locked vortex and downward to be reattached to the wing's upper surface behind the vortex. This limits flow separation of airflow across the upper surface of the wing, which typically happens at relatively low speeds, e.g., takeoff or landing, or when the wing is at a high angle of attack. This spanwise fluid dynamic also pushes the already-formed wing tip vortices outward, thus increasing effective wing span and decreasing induced drag. Although configurational aerodynamic penalties are minimized, vortex attenuation is limited in effectiveness and of secondary consequence in view of the fact that the desired fluid interaction is directed toward the primary purpose of flow separation reduction; the spanwise fluid interaction with an established vortex is thus seen as less than ideal for accomplishing the vortex attenuation purpose.

In an embodiment disclosed by Griswold II, U.S. Pat. No. 4,477,042, at FIG. 11 therein, the wing tip is contoured downward and the fluid is discharged therefrom linearly and tangentially with respect to the upper and lower surfaces near the release slot. The downward curvature and fluid discharge together act on the source of the vortex generation so that a milder vortex is shed outboard the wing tip. Again, a configurational aspect negatively impacts the aerodynamics; in this case, structural alteration at the wing tip works to the detriment of wing efficiency. The same can be said for a jet stream which is discharged outwardly at a downward angle from the wing tip. Moreover, although this fluid discharge methodology attacks the tip vortex at an early stage in its formation, it nevertheless allows its formation to a point and then attenuates it.

Yuan, U.S. Pat. No. 3,692,259, discloses both strictly configurational and internally-derived fluid discharge approaches. In a configurational embodiment a rotating blower at the wing tip draws air from the lower wing and releases it through a slot at the wing tip. Other embodiments of Yuan at '259 seek to avoid configurationally-derived aerodynamic detriment by deriving the discharged fluid internally and utilizing an ordinary wing tip; in other words, rather than angle the internal fluid conduit near the release point in accordance with the contour of a downwardly curved wing tip, e.g., as in Griswold II, the internal fluid conduit is angled downward near the release point but the wing tip remains relatively horizontal. In theory Yuan at '259 is adaptable to any wing tip, and the wing tip is permitted to retain its original design integrity; in practice, however, some difficulties may be posed in internally fitting the fluid conduit in the desired manner and for effectuating the desired release in view of the panoply of wing thicknesses and shapes. Yuan at U.S. Pat. No. 3,936,013 addresses this by externally configuring a tube projecting spanwise from the wing tip, the tube discharging fluid in selected directions, but the tube itself exacts an aerodynamic price.

Yuan at '259 perhaps implicitly recognizes that it is increasingly effective to attack the vortex with increasing proximity to the source of the vortex. Yuan's methodology is to set up a fluid flow which is counter-directional to the crossflow from the lower wing to the upper wing. Although Yuan at '259 seeks to provide the counter-rotational flow to this end, its effectiveness is limited because the release point of the fluid is located at or near the outboard-most point of the wing tip, midway or nearly midway between the upper surface and the lower surface, and the fluid flow is directionally more outward and spanwise and less downward and counter-rotational; moreover, an approach which attempts to reduce the vortex by meeting it head-on as it crossflows from the lower to the upper wing is problematical. Another embodiment therein seeks to improve the rotational flow by adding a second fluid jet. Yuan at '259 also discloses an embodiment utilizing a rotating cylinder at the wing tip which simultaneously discharges and rotates the released fluid, seeking to improve the rotational aspect of the flow; still, the requisite machinery itself carries aerodynamic and practical disadvantages.

It is also desirable to have the flexibility to vary the fluid interaction with the tip vortex, in order to accomplish the vortex-attenuation purpose. It is a relatively simple matter to mechanically regulate the fluid flow in terms of mass flow; nevertheless, conventional approaches to vortex attenuation require more complex variability of the fluid flow in terms of intensity and direction, which is less easily accomplished, in order to meet varying aerodynamic demands. Yuan at '259, for example, proposes to vary the chordwise flow in accordance with varying slot widths or hole diameters; of course, utilization of apertures of varying sizes and shapes in this manner is limited because these sizes and shapes cannot be changed. For the above-described rotating wing tip, Yuan varies the rotational speed of the cylinder.

In any case, a review of conventional approaches to vortex attenuation points up the desirability of a simple, efficient and adaptable approach thereto which effectively obstructs or impedes crossflow from the lower wing surface to the upper wing surface, and which accommodates a variety of airfoil shapes and aerodynamic situations.

The present invention utilizes a well-known phenomenon of fluid motion, viz., the tendency of a fluid jet to adhere to an adjacent curved surface. This attraction/entrainment phenomenon is known as the Coanda effect, named after the inventor for a French Patent which issued in 1932. For an excellent discussion on the Coanda effect, see Wille, R., and Fernholz, H., "Report on the first European Mechanics Colloquium, on the Coanda effect," *Journal of Fluid Mechanics*, vol. 23, part 4, pp. 801–819, Cambridge at the University Press (1965).

Utilization of the Coanda effect has been known in various aerodynamic contexts, notably in circulation control applications for aircraft such as STOL and X-wing. Examples are found at Cycon et al., U.S. Pat. No. 4,770,607; Bennett et al., U.S. Pat. No. 4,736,913; Thomas, U.S. Pat. No. 4,682,746; Moore, U.S. Pat. No. 4,674,716; Groth, U.S. Pat. No. 4,146,197; Hirt et al., U.S. Pat. No. 4,019,696.

OBJECTS OF THE INVENTION

In view of the foregoing, it is an object of the present invention to attenuate the wing tip vortices of an aircraft by stemming the generation of the vortices at or near the source of the generation, thereby preventing or substantially preventing the formation of the vortices.

It is a further object of the present invention to attenuate the wing tip vortices of an aircraft and thereby improve wing efficiency and overall aerodynamic efficiency.

Another object of this invention is to attenuate the wing tip vortices of an aircraft and thereby alleviate wake turbulance and related problems surrounding takeoff and landing intervals at airports.

It is a further object of this invention to attenuate the wing tip vortices of an aircraft without incurring significant aerodynamic penalties.

Another object of this invention is to attenuate the wing tip vortices of an aircraft in a manner which is efficient and simple in operation.

A further object of this invention is to attenuate the wing tip vortices of an aircraft in a manner which is readily adaptable to a variety of wing shapes.

Yet another object of this invention is to attenuate the wing tip vortices of an aircraft in a manner which retains effectiveness with varying aerodynamic situations.

SUMMARY OF THE INVENTION

The present invention provides a wing tip for attenuating wing tip vortices. The wing tip is in an aircraft wing of finite span having an upper wing surface and a lower wing surface, the wing being capable of producing lift or thrust when in relative motion through a fluid. The fluid is higher pressure fluid below the lower wing surface and lower pressure fluid above the upper wing surface during the motion. The wing tip comprises a Coanda surface having an upper bound and a lower bound, and means for discharging compressed fluid adjacent the upper bound of the Coanda surface, whereby when the compressed fluid is discharged at least a portion of the compressed fluid is entrained by the Coanda surface and deflected downward from the Coanda surface, the compressed fluid forming a fluid barrier for substantially preventing crossflow of the higher pressure fluid from below the lower wing surface to above the upper wing surface.

In any fluid foil moving relatively through a fluid and separating a high pressure fluid region from a low pressure fluid region, the present invention provides a fluid foil tip for attenuating fluid foil tip vortices. The fluid foil tip comprises Coanda surface means and means for discharging compressed fluid adjacent the Coanda surface means, whereby when the compressed fluid is discharged at least a portion of the compressed fluid is entrained by and deflected by the Coanda surface means, the compressed fluid forming a fluid barrier for substantially preventing crossflow of fluid from the higher pressure fluid region to the lower pressure fluid region. The fluid foil is an airfoil, for motion through a gaseous fluid, or a hydrofoil, for motion through a liquid fluid. The term "compressed fluid" is intended herein throughout to include "pressurized fluid," compressed fluid being pressurized fluid for most liquid fluid applications.

For a fluid foil having a fluid foil tip, the fluid foil moving relatively through a fluid and separating a high pressure fluid region from a low pressure fluid region, the present invention provides apparatus for attenuating fluid foil tip vortices, comprising Coanda surface means, a source of compressed fluid, means for discharging the compressed fluid adjacent the Coanda surface means, and means for conducting the compressed fluid from the source of the compressed fluid to the discharging means, whereby when the compressed fluid is conducted and discharged at least a portion of the compressed fluid is entrained by and deflected by the Coanda surface means, the compressed fluid forming a fluid barrier for substantially preventing crossflow of fluid from the higher pressure fluid region to the lower pressure fluid region.

When the fluid foil is a flap which is coupled with a second fluid foil, and the fluid foil tip is a flap tip, this invention provides apparatus for attenuating fluid foil tip vortices, as wherein the flap tip abuts an edge of the second fluid foil, the Coanda surface means includes a first Coanda surface and a second Coanda surface, the first Coanda surface located at the flap tip, the second Coanda surface located at the edge of the second fluid foil, and wherein the fluid barrier is formed contributorily by and generally interpositionally between the first Coanda surface and the second Coanda surface.

The present invention also provides a method for attenuating fluid foil tip vortices in a fluid foil moving relatively through a fluid and separating a high pressure fluid region from a low Pressure fluid region, the fluid foil being an airfoil or a hydrofoil. The method comprises discharging compressed fluid adjacent Coanda surface means, whereby when the compressed fluid is discharged at least a portion of the compressed fluid is entrained by and deflected by the Coanda surface means, the compressed fluid forming a fluid barrier for substantially preventing crossflow of fluid from the higher pressure fluid region to the lower pressure fluid region.

This invention further provides a method for attenuating fluid foil flap tip vortices in a fluid foil having a fluid foil flap, the fluid foil flap having a fluid foil flap tip, the fluid foil flap moving relatively through a fluid and separating a high pressure fluid region from a low pressure fluid region. This method comprises discharging compressed fluid adjacent Coanda surface means, whereby when the compressed fluid is discharged at least a portion of the compressed fluid is entrained by and deflected by the Coanda surface means, the compressed fluid forming a fluid barrier for substantially preventing crossflow of fluid from the higher pressure fluid region to the lower pressure fluid region. This method also provides for the Coanda surface means including a first Coanda surface and a second Coanda surface, the first Coanda surface located at the fluid foil flap tip and the second Coanda surface located at the edge of the fluid foil, wherein the fluid foil flap tip abuts an edge of the fluid foil. The fluid barrier is formed contributorily by and generally interpositionally between the first Coanda surface and the second Coanda surface.

The main features of the present invention are the Coanda surface tip, the Coanda fluid curtain which is formed when discharged compressed fluid is entrained by and tangentially deflected by the tip's Coanda surface, the resultant crossflow-stemming dynamic and the invention's overall simplicity and singleness of purpose, viz., vortex attenuation. The Coanda curtain establishes a fluid barricade which extends generally chordwise and perpendicular to the fluid foil plane and tangential to the fluid foil tip, and which borders on the higher pressure fluid region which is separated from the lower pressure fluid region by the fluid foil. The higher pressure fluid cannot even begin to crossflow into the lower pressure fluid region, since the Coanda curtain stems this crossflow tendency at its inception, along the periphery between the higher pressure fluid region and the crossflow region.

The present invention thus offers several advantages. First of all, rather than seeking to act upon a formed or partially formed vortex, this invention prevents or substantially prevents its formation by attacking vortex generation at or near its source. This cross-flow stemming approach is inherently superior because it avoids inevitable negative aerodynamic consequences of acting upon a vortex which already at least in part exists. Furthermore, since vortex generation is substantially stemmed, effective wing span is maximized and aspect ratio optimized for lift.

This invention avoids mechanical complexity, has no moving parts, and is structurally clean. It involves no external structural change or amplification and therefore carries no configurational disturbance of the aerodynamic balance. Internal spacial or envelope requirements and penalties are minimized because the compressed fluid is discharged tangentially along the surface adjacent the Coanda surface at the fluid foil tip; the fluid foil can remain as thin as the original design intended it to be. The fluid foil, and especially the fluid foil tip, can retain its original design integrity, for this invention will admit of application virtually regardless of shape. In fact, this invention will permit design improvement; for example, a rounded wing tip can be squared so as to maintain the desired aspect ratio and yet eliminate wing tip surplusage which was originally intended for vortex attenuation and the need for which is cbviated by this invention.

Moreover, the Coanda curtain causes minimal fluid disturbance of the aerodynamic balance, particularly in the conventional aircraft having a Coanda curtain at the left wing tip and a Coanda curtain at the right wing tip, balanced about the central fuselage. Variation of the vortex attenuator is easily accomplished by simply regulating the mass flow of the discharged compressed fluid. There is no need for effectuating more complicated changes in flow direction or intensity. The mass flow can be turned off or appreciably decreased when the vortex attenuator is not needed, as, for example, during above-cruising speeds. The mass flow can be adjusted for Coanda curtain optimization in accordance with the aerodynamic and gravitational requirements of varying aircraft speeds and angles of inclination.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
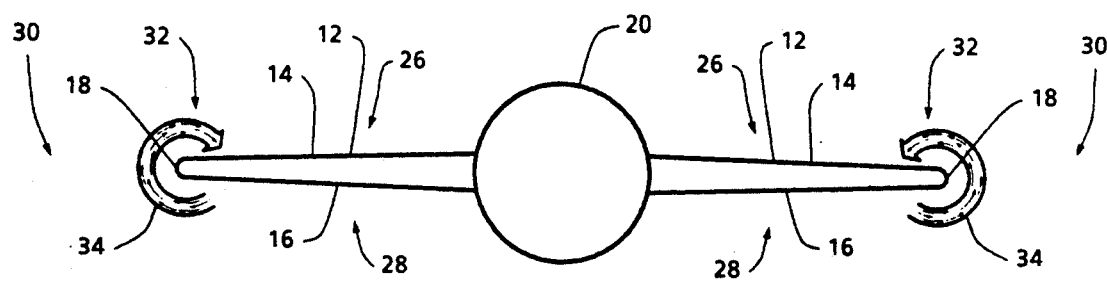
FIG. 1 is a front elevational view of a conventional aircraft, illustrating generation of wing tip vortices under standard conditions.

Referring now to FIG. 1, a conventional aircraft having central fuselage 20 and wing 12 is flying under standard atmospheric conditions. Wing 12 has upper wing surface 14, lower wing surface 16, a first wing tip 18 and a second wing tip 18 located on the opposite side of fuselage 20. During this relative motion of wing 12 through the surrounding fluid, the fluid flowing over upper wing surface 14 achieves a greater velocity than the fluid flowing under lower wing surface 16, creating a pressure differential involving separation of the fluid into a lower pressure fluid region 26 above upper wing surface 14 and a higher pressure fluid region 28 below lower wing surface 16, and producing lift. Ambient fluid region 30 is outboard of each wing tip 18 and remains unaffected by these dynamics, retaining standard atmospheric pressure. Due to the finite wing span of wing 12, the fluid in the vicinity of each wing tip 18 has a flow tendency around wing tip 18 from below lower wing surface 16 to above upper wing surface 14, this crossflow forming unattenuated wing tip vortex 34 at each wing tip 18 in crossflow region 32 inboard of ambient fluid region 30.

Figure 2:
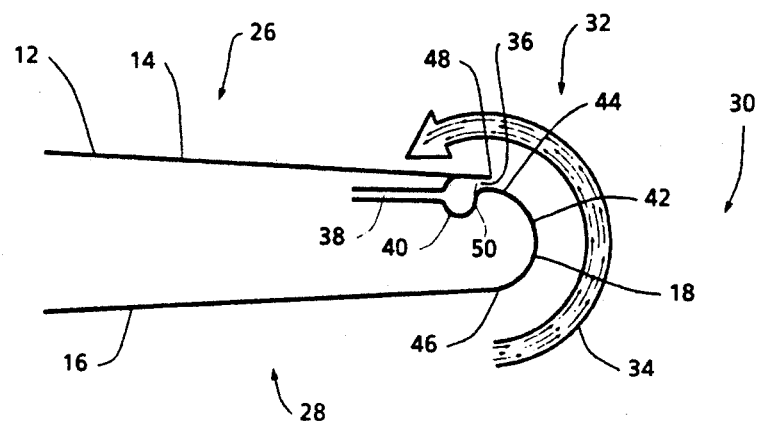
FIG. 2 is a fragmentary side sectional view of an aircraft wing including the wing tip, taken on line 2—2 of FIG. 5, with the vortex attenuation system in accordance with the present invention deactuated.
Figure 3:
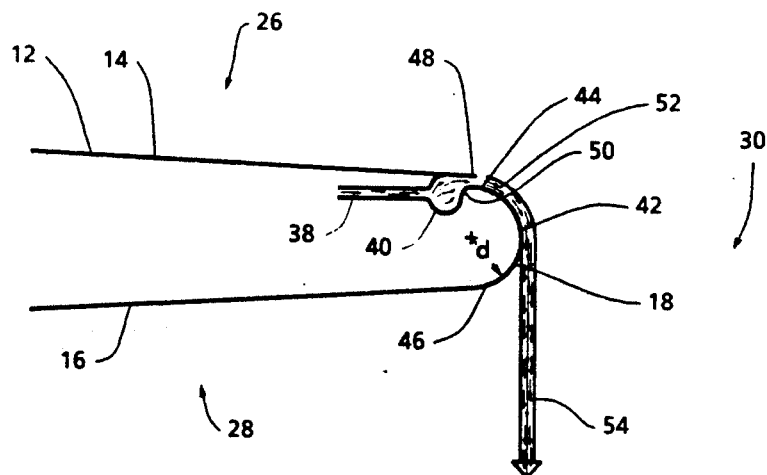
FIG. 3 is a view similar to FIG. 2, with the vortex attenuation system according to this invention actuated.

With reference to FIG. 2 and FIG. 3, wing tip 18 has fluid discharge slot 36 and Coanda surface 42. Fluid conduit 38 in wing 12 conducts compressed fluid to fluid conduit 38 from a compressed fluid source in the aircraft. In FIG. 2 vortex 34 remains unattenuated in the absence of vortex attenuation effectuation in accordance with the present invention.

Fluid discharge slot 36 is located at wing tip 18 in upper wing surface 14. In FIG. 3 vortex attenuation according to this invention is actuated, and compressed fluid is discharged tangentially along upper wing surface 14, adjacent Coanda surface 42. This compressed fluid, or at least a portion thereof, is entrained by Coanda surface 42 and deflected tangentially downward from Coanda surface 42, forming Coanda curtain 54. Coanda curtain 54 is a fluid barrier which prevents, or at least substantially Prevents, crossflow of higher pressure fluid from higher pressure fluid region 28 below lower wing surface 16 to lower pressure fluid region 26 above upper wing surface 14. Formation of vortex 34 is prevented or substantially prevented at its inception, and crossflow region 32 is eliminated or virtually eliminated.

Coanda surface 42 has a Coanda upper bound 44 and a Coanda lower bound 46. The compressed fluid is discharged by fluid discharge slot 36 adjacent Coanda upper bound 44 from a location proximate Coanda upper bound 44. In order to maximize wing span and therefore aspect ratio, Coanda surface 42 preferably intersects the outboard-most location of wing tip 18. For best results Coanda surface 42 is elevationally convex. In preferred embodiments this convexity defines a substantially semicircular shape having Coanda diameter d, the diameter connecting Coanda upper bound 44 and Coanda lower bound 46 of Coanda surface 42, and Coanda diameter d is substantially perpendicular to span line s of wing 12.

Fluid discharge slot 36 is bordered, in a generally chordwise direction, by upper discharge slot edge 48 and lower discharge slot edge 50. Upper discharge slot edge 48 as well as lower discharge slot edge 50 is integrated in upper wing surface 14. Lower discharge slot edge 50 is located below, in a generally elevational direction, upper discharge slot edge 48. Upper discharge slot edge 48 is preferably located, in a generally spanwise direction, outboard of lower discharge slot edge 50. Upper discharge slot edge 48 and lower discharge slot edge 50 are appropriately disposed for admitting of smooth circulatory flow of compressed fluid pursuant to fluid discharge by fluid discharge slot 36 and entrainment and deflection by Coanda surface 42.

Figure 4:
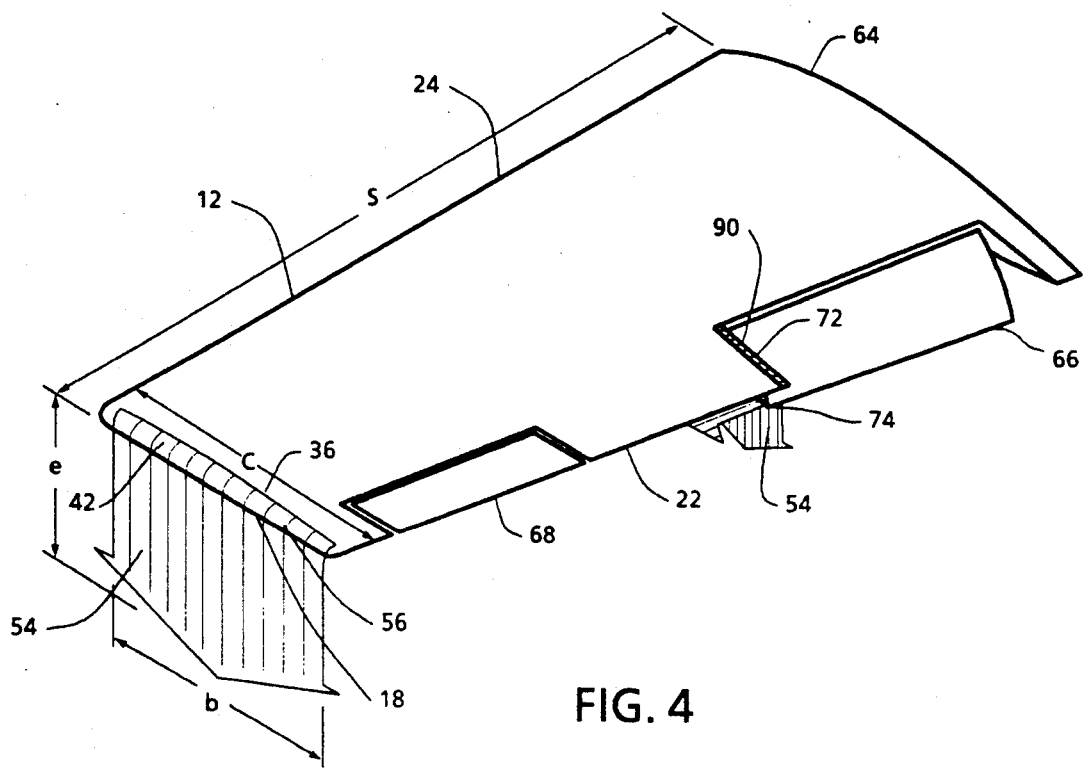
FIG. 4 is a fragmentary top perspective view of an aircraft wing including the wing tip, with the vortex attenuation system according to the present invention actuated at the wing tip and wing-flap junction locations.

Referring to FIG. 4, Coanda curtain 54 extends in a generally chordwise direction and downward from Coanda surface 42 substantially perpendicular to the plane defined by wing 12. It is preferable that Coanda curtain 54 cover as great an area as possible two-dimensionally, in both the chordwise (horizontal) and elevational (vertical) directions, in order to prevent circumventional fluid flow from higher pressure fluid region 28 with respect to Coanda curtain 54—thereby preventing this flow of higher pressure fluid beyond Coanda curtain 54 and optimizing vortex attenuation. Fluid discharge slot 36 extends in a generally chordwise direction from a location proximate leading edge 22 of wing 12 to a location proximate trailing edge 24 of wing 12, in this way maximizing breadth b of Coanda curtain 54, i.e., the length of Coanda curtain 54 in a generally chordwise direction. Similarly, Coanda upper bound 44 extends in a generally chordwise direction from a location proximate leading edge 22 of wing 12 to a location proximate trailing edge 24 of wing 12. In embodiments wherein Coanda surface 42 is elevationally convex Coanda lower bound 46 preferably also extends in a generally chordwise direction form a location Proximate leading edge 22 to a location proximate trailing edge 24. Where this convexity defines a substantially semicircular shape having Coanda diameter d connecting Coanda upper bound 44 and Coanda lower bound 46, Coanda upper bound 44 and Coanda lower bound 46 are essentially parallel.

Breadth b of Coanda curtain 54 is substantially equivalent to planwise contour length c of the wing tip planwise contour of wing tip 18, here illustrating essentially straight planwise contour 56 of square wing tip 18. Coanda curtain 54 extends in a generally chordwise direction, breadth b, a sufficient distance fore and aft for substantially preventing this flow beyond Coanda curtain 54 from higher pressure fluid region 28. Additionally, Coanda curtain 54 extends downward from Coanda surface 42 elevational length e, a sufficient distance for substantially preventing this flow beyond Coanda curtain 54 from higher pressure fluid region 28.

Coanda curtain 54 defines a plane which is substantially perpendicular to the plane defined by wing 12 and which is tangential to wing tip 18. In furtherance of aspect ratio optimization Coanda curtain 54 is preferably tangential to wing tip 18 at the outboard-most location of wing tip 18. In some embodiments Coanda curtain 54 is tangential to wing tip 18 generally along a line which defines the mean camber line of wing tip 18. Coanda curtain 54 preferably extends downward from Coanda surface 42 substantially perpendicular to span line s defined by wing 12.

In preferred embodiments fluid discharge slot 36 defines a shape which is substantially parallel, from leading edge 22 to trailing edge 24, to the planwise contour of wing tip 18. Similarly, Coanda upper bound 44 preferably defines a shape which is substantially parallel to the planwise contour of wing tip 18 from leading edge 22 to trailing edge 24. Hence, in preferred embodiments Coanda upper bound 44 defines a shape which is substantially parallel to the shape defined by fluid discharge slot 36.

Figure 5:
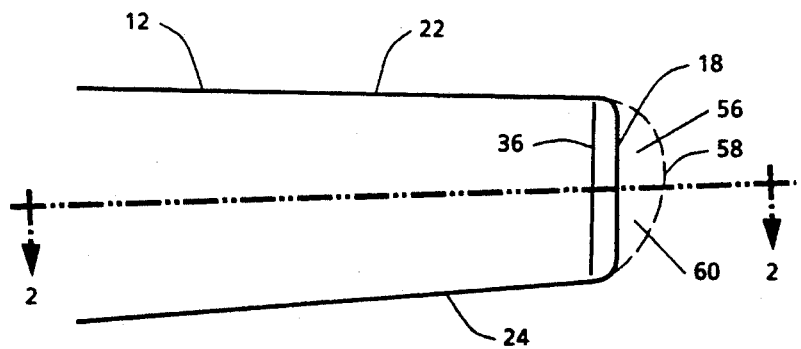
FIG. 5 is a fragmentary top plan view of an aircraft wing with a square wing tip having a fluid discharge slot according to this invention, further diagrammatically illustrating a rounded wing tip for the same wing.
Figure 6:
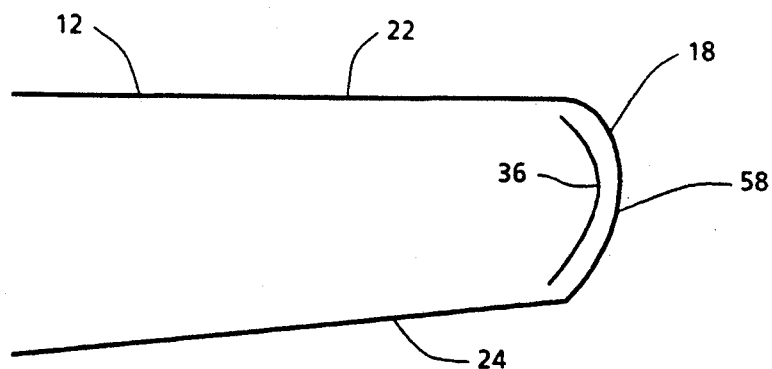
FIG. 6 is a fragmentary top plan view of an aircraft wing with a rounded wing tip having a fluid discharge slot according to this invention.
Figure 7:
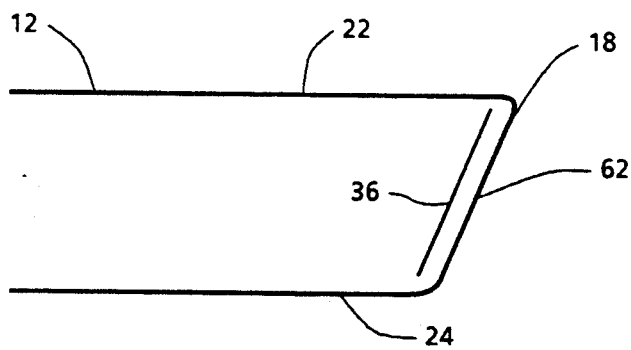
FIG. 7 is a fragmentary top plan view of an aircraft wing with a raked wing tip having a fluid discharge slot according to this invention.
Figure 8:
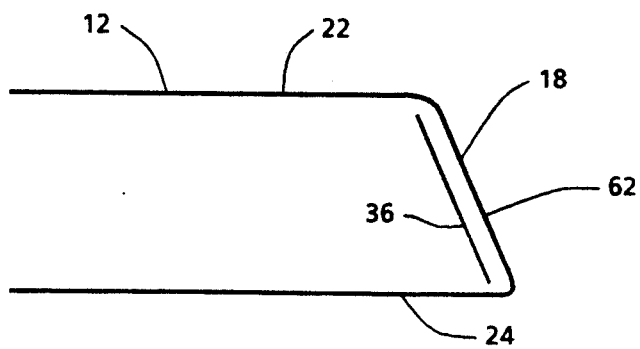
FIG. 8 is a view similar to FIG. 7, with the wing tip raked in the opposite direction.

Reference now being made to FIG. 5, FIG. 6, FIG. 7, and FIG. 8, wing tip 18 is shown having various wing tip shapes, i.e., with various shapes of its planwise contour. In FIG. 5 wing tip 18 is a square wing tip from leading edge 22 to trailing edge 24, and fluid discharge slot 36 and Coanda upper bound 44 each defines a substantially linear shape which is substantially parallel to straight planwise contour 56 of square wing tip 18. In FIG. 6 wing tip 18 is a rounded wing tip from leading edge 22 to trailing edge 24, and fluid discharge slot 36 and Coanda upper bound 44 each defines a curvilinear shape which 's substantially parallel to curved contour 58 of rounded wing tip 18. In FIG. 7 and FIG. 8 wing tip 18 is a raked wing tip from leading edge 22 to trailing edge 24, and fluid discharge slot 36 and Coanda upper bound 44 each defines a substantially linear shape which is substantially parallel to raked planwise contour 62 of raked wing tip 18.

FIG. 5 illustrates the advantageous application of the present invention for a square wing tip with straight planwise contour 56 compared with non-application thereof for a rounded wing tip with curved planwise contour 58. Rounded wing tip 18 having curved planwise contour 58 is essentially formed by the addition of extra wing plan area 60 beyond square wing tip 18 having straight planwise contour 56. Extra wing plan area 60 contributes little to the aircraft's aerodynamics that is positive other than a limited vortex attenuation function, and in fact constitutes a drag element; with utilization of a square wing tip embodiment of the present invention having straight planwise contour 56, extra wing plan area 60 can be eliminated and aerodynamic efficiency thereby improved.

In some embodiments inclusion of manifold 40 is preferable for evenly spreading the flow of the compressed fluid from fluid conduit 38 about the expanse of fluid discharge slot 36. Manifold 40 is located between fluid conduit 38 and fluid discharge slot 36.

The source of the compressed fluid is a mechanism intrinsic to the aircraft, an auxiliary mechanism, or a plenum. An example of the first is a jet engine compressor, from which the compressed fluid is derived via jet engine bleed. Examples of the second are an auxiliary air compressor and an externally-configured fluid-gathering or fluid-capturing device. Flow rate control means, such as a regulatory device, for controlling the flow rate of the compressed fluid, is preferable for most embodiments.

Figure 9:
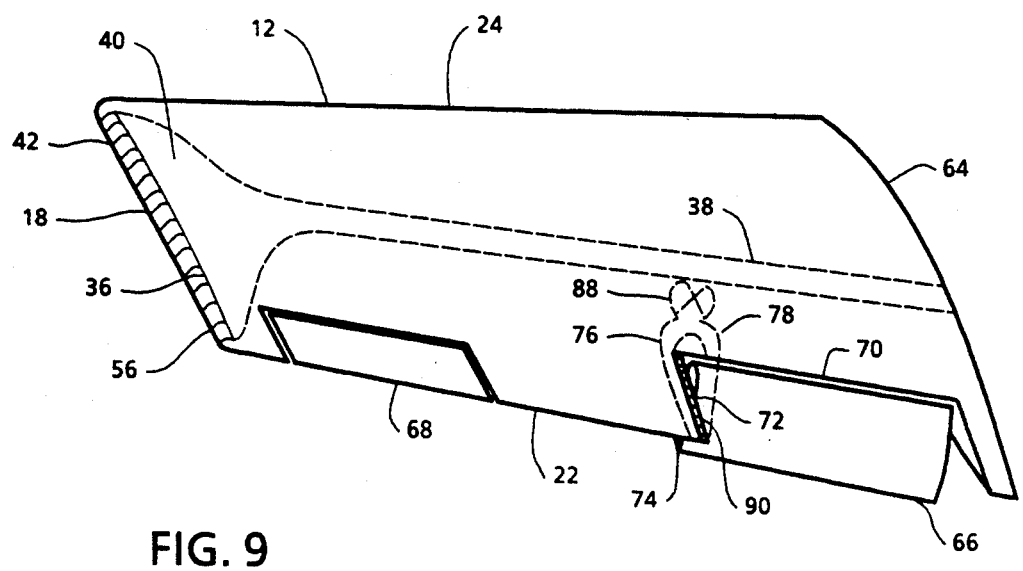
FIG. 9 is a fragmentary top perspective view of an aircraft wing with a moveable flap, the flap having a fluid discharge slot according to this invention and abutting an edge portion of the wing having another fluid discharge slot according to this invention.
Figure 10:
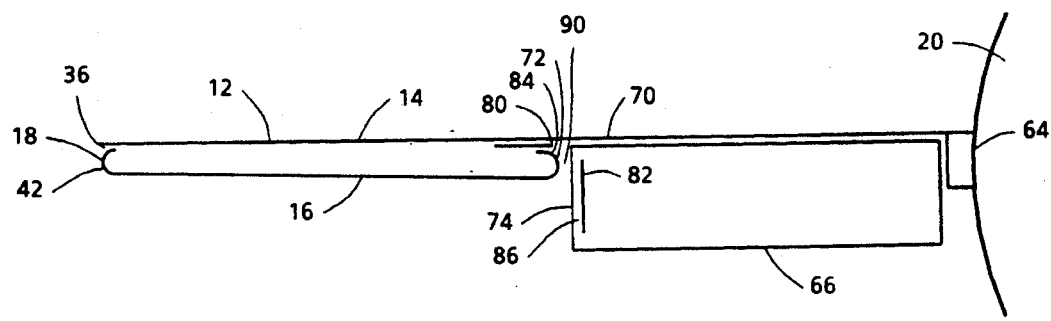
FIG. 10 is a rear elevational view of the wing with flap in FIG. 9.
Figure 11:
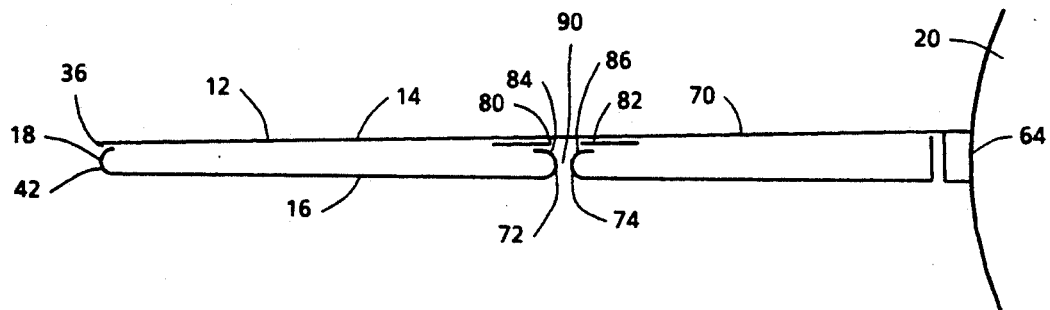
FIG. 11 is a view similar to FIG. 10, with the flap in the up position.

In some embodiments it is desirable to attenuate the tip vortices generated by or as a result of a fluid foil flap which is coupled with a fluid foil, as an addition to or an alternative to attenuating the wing tip vortices generated by the fluid foil. With reference now to FIG. 9, wing 12 has wing flap 66 and aileron 68 and meets fuselage 20 at wing-fuselage juncture 64, aileron 68 being shown for illustrative purposes only as representative of a preferred rolling and banking control means for many aircraft. As wing 12 and therefore wing flap 66 moves through a fluid, wing flap 66 separates a higher pressure fluid region from a lower pressure fluid region when wing flap 66 is in a down position, as shown in FIG. 10. This results in crossflow of fluid from the higher pressure fluid region to the lower pressure fluid region at what is effectively the flap airfoil tip, viz., flap side 74; additionally, separation by wing 12 of a higher pressure fluid region from a lower pressure fluid region results in crossflow of fluid from the higher pressure fluid region to the lower pressure fluid region at the abutting edge of wing 12, viz., wing edge 72, when wing flap 66 is in the down position. In FIG. 11 the crossflow at wing-flap junction 90 is minimized as wing flap 66 approaches the up position wherein wing flap 66 is even or substantially even with the main portion of wing 12. Significant crossflow generally occurs when wing flap 66 is at some angle of downward inclination with respect to the plane defined by wing 12, about 30° to 60°. Wing flap 66 is coupled with wing 12 via flap hinge 70. Flap side 74 abuts wing edge 72 at wing-flap junction 90. A first Coanda surface, flap side Coanda surface 86, is located at flap side 74; a second Coanda surface, wing edge Coanda surface 84, is located at wing edge 72. Referring to FIG. 4, compressed fluid is discharged from flap side discharge slot 82, and at least a portion thereof is entrained by and deflected by flap side Coanda surface 86, the compressed fluid forming flap side Coanda curtain 54. Similarly, compressed fluid is discharged from wing edge discharge slot 80, and at least a portion thereof is entrained by and deflected by wing edge Coanda surface 84, this compressed fluid forming wing edge Coanda curtain 54. By operating cooperatively and combinationally so as to form a more effective Coanda curtain 54 which covers a greater two-dimensional area, flap side Coanda curtain 54 and wing edge Coanda curtain 54 together optimize attenuation of the vortices generated at wing-flap junction 90. Aggregate Coanda curtain 54 is formed contributorily and generally interpositionally between flap side Coanda surface 86 and wing edge Coanda surface 84. In alternative embodiments either Coanda system can operate in the absence of the other for attenuation of vortices generated at wing-flap junction 90, albeit with generally less favorable results.

Fluid conduit 38 has flap side fluid duct 78 and wing edge fluid duct 76 for conducting compressed fluid to flap side discharge slot 82 and wing edge discharge slot 80, respectively. Flap side fluid duct 78 is appropriately flexible for accommodating movement by wing flap 66. In some embodiments fluid conduit 38 is additionally available to conduct compressed fluid to wing tip 18. In alternative embodiments separate fluid conduits 38 from the compressed fluid source lead to flap side discharge slot 82 and/or wing edge discharge slot 80 and/or wing tip 18. More than one compressed fluid flow rate control means is preferable in some embodiments. For example, in one embodiment a main control valve regulates flow rate from the compressed fluid source, and secondary control valve 88 regulates flow rate to wing edge discharge slot 80 and flap side discharge slot 82. The wing tip vortex attenuation system is generally actuated during take-off, climb, cruise, descent and landing. The wing-flap junction vortex attenuation system is generally actuated during take-off and landing, and during other circumstances that dictate use of deflected flaps.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. In an aircraft wing of finite span having an upper wing surface, a lower wing surface and a wing tip, said wing being capable of producing lift or thrust when in relative motion through a fluid, said fluid being higher pressure fluid below said lower wing surface and lower pressure fluid above said upper wing surface during said motion, apparatus for attenuating wing tip vortices and thereby increasing wing efficiency and overall aerodynamic efficiency and decreasing wake turbulence, comprising:

a Coanda surface on said wing tip, said Coanda surface having an upper bound and a lower bound; and adjustable flow rate means for discharging tipwardly spanwise, tangentially along a portion of said upper wing surface and adjacent said upper bound of said Coanda surface, compressed fluid having variable mass flow;

whereby when said compressed fluid is discharged at least a portion of said compressed fluid is entrained by said Coanda surface and deflected downward from said Coanda surface, said compressed fluid forming a fluid barrier for substantially preventing crossflow of said high pressure fluid from below said lower wing surface to above said upper wing surface and thereby stemming generation of said vortices;

said fluid barrier defining a plane which extends in a generally chordwise direction and downward from said Coanda surface substantially perpendicular to the plane defined by said wing and substantially perpendicular to the span line defined by said wing;

said fluid barrier being tangential to said wing tip at the outboard-most location of said wing tip and generally along a line which defines the mean camber line of said wing tip;

said fluid barrier extending downward from said Coanda surface a sufficient distance and in a generally chordwise direction a sufficient distance for and aft for substantially preventing flow of said higher pressure fluid beyond said fluid barrier;

the length of said fluid barrier in a generally chordwise direction being substantially equivalent to the planwise contour length of said wing tip;

said adjustable flow rate means for discharging compressed fluid including a fluid discharge slot located in said upper wing surface;

said fluid discharge slot defining a shape which is substantially parallel to the planwise contour of said wing tip from the leading edge of said wing to the trailing edge of said wing;

said fluid discharge slot extending in a generally chordwise direction from a location proximate said leading edge of said wing to a location proximate said trailing edge of said wing;

said fluid discharge slot being bordered, in said generally chordwise direction, by an upper slot edge and a lower slot edge, each said slot edge being integrated in said upper wing surface;

said lower slot edge being located below, in a generally elevational direction, said upper slot edge;

said upper slot edge being located, in a generally spanwise direction, outboard of said lower slot edge;

said Coanda surface being an elevationally convex Coanda surface which intersects said outboardmost location of said wing tip;

said convexity of said Coanda surface defining a substantially semicircular shape having a diametric plane, connecting said upper bound and said lower bound of said Coanda surface, which is substantially parallel to said plane defined by said fluid barrier, substantially perpendicular to said plane defined by said wing, said substantially perpendicular to said span line defined by said wing;

each said bound of said Coanda surface extending in a generally chordwise direction from a location proximate said leading edge of said wing to a location proximate said trailing edge of said wing;

each said bound of said Coanda surface defining a shape which is substantially parallel to said shape defined by said fluid discharge slot and substantially parallel to said planwise contour of said wing tip from said leading edge of said wing to said trailing edge of said wing.

* * * * *